United States Patent
Zhu et al.

(10) Patent No.: US 9,248,612 B2
(45) Date of Patent: Feb. 2, 2016

(54) CONTAINMENT CASE AND METHOD OF MANUFACTURE

(75) Inventors: Qi Zhu, Simpsonville, SC (US); Scott Roger Finn, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 85 days.

(21) Appl. No.: 13/326,455

(22) Filed: Dec. 15, 2011

(65) Prior Publication Data

US 2013/0153456 A1 Jun. 20, 2013

(51) Int. Cl.
| | | |
|---|---|---|
| A47G 19/22 | (2006.01) | |
| B29C 70/08 | (2006.01) | |
| F01D 5/28 | (2006.01) | |
| F01D 25/24 | (2006.01) | |
| B29L 31/00 | (2006.01) | |

(52) U.S. Cl.
CPC . B29C 70/08 (2013.01); F01D 5/28 (2013.01); F01D 5/282 (2013.01); F01D 25/24 (2013.01); B29K 2995/0089 (2013.01); B29L 2031/7504 (2013.01); Y02T 50/672 (2013.01)

(58) Field of Classification Search
CPC ............ B29C 70/08; B29K 2995/0089; B29L 2031/7504; F01D 25/24; F01D 5/28; F01D 5/282
USPC ........................................................ 428/34.5
See application file for complete search history.

(56) References Cited

U.S. PATENT DOCUMENTS

| | | | | |
|---|---|---|---|---|
| 3,834,832 A | * | 9/1974 | Mallinder et al. | ............ 416/230 |
| 4,035,550 A | * | 7/1977 | Suh et al. | ....................... 428/339 |
| 4,197,756 A | * | 4/1980 | Yaros | ........................... 29/892.1 |

(Continued)

FOREIGN PATENT DOCUMENTS

| | | |
|---|---|---|
| EP | 2070689 A2 | 6/2009 |
| JP | 2002020459 A | 1/2002 |

(Continued)

OTHER PUBLICATIONS

Casas et al., "Automatic Design and Optimization of Wind Turbine Blades", Computational Intelligence for Modelling, Control and Automation, 2006 and International Conference on Intelligent Agents, Web Technologies and Internet Commerce, International Conference, IPrint ISBN: 0-7695-2731-0, on p. 205, References Cited: 11, Issue Date : Nov. 28, 2006-Dec. 1, 2006.

(Continued)

*Primary Examiner* — James Yager
(74) *Attorney, Agent, or Firm* — Paul J. DiConza (57) ABSTRACT

A containment case comprises a composite core, with an inner and outer surface, at least one puncture resistant layer bonded to the inner surface of the composite core and at least one energy capture layer bonded to the outer surface of the composite core. The puncture resistant layer having a high through-thickness shear strength and high interlaminar toughness at impact. The energy capture layer having a high in-plane tensile strength and low resistance to delamination and fiber-matrix debonding at impact. A method of fabricating a containment case includes the steps of disposing one or more layers of a puncture resistant material on a layup mandrel, disposing one more layers of a structural composite material on an exterior surface of the puncture resistant material, disposing one or more layers of an energy capture material on an exterior surface of the structural material and curing a resin in the plurality of layers.

17 Claims, 6 Drawing Sheets

(56) References Cited

U.S. PATENT DOCUMENTS

| | | | |
|---|---|---|---|
| 5,246,520 A * | 9/1993 | Scanlon et al. | 156/245 |
| 6,979,172 B1 | 12/2005 | Mackenzie | |
| 7,390,161 B2 | 6/2008 | Xie et al. | |
| 7,794,197 B2 | 9/2010 | Thompson et al. | |
| 8,017,188 B2 | 9/2011 | Xie et al. | |
| 2004/0211167 A1 | 10/2004 | Schreiber | |
| 2006/0034682 A1 | 2/2006 | Mcmillan | |
| 2006/0093847 A1 | 5/2006 | Hornick et al. | |
| 2007/0105471 A1 | 5/2007 | Wang et al. | |
| 2008/0128073 A1 | 6/2008 | Xie et al. | |
| 2008/0145215 A1 | 6/2008 | Finn et al. | |
| 2008/0185874 A1 * | 8/2008 | Kimoto et al. | 296/203.01 |
| 2008/0187441 A1 | 8/2008 | Schreibe | |
| 2009/0155044 A1 * | 6/2009 | Xie et al. | 415/9 |
| 2009/0175714 A1 | 7/2009 | Cacace | |
| 2009/0226310 A1 | 9/2009 | Finn et al. | |
| 2010/0077721 A1 | 4/2010 | Marshall | |
| 2010/0150696 A1 | 6/2010 | Lenk | |
| 2010/0196654 A1 | 8/2010 | Maheshwari | |

FOREIGN PATENT DOCUMENTS

| | | |
|---|---|---|
| JP | 2003082072 A | 3/2003 |
| JP | 2003261381 A | 9/2003 |
| JP | 2006177364 A | 7/2006 |
| JP | 2011088363 A | 5/2011 |

OTHER PUBLICATIONS

Office Action issued in connection with corresponding CN Application No. 201280069831.3 on Feb. 27, 2015.

Search Report and Written Opinion from corresponding PCT Application No. PCT/US2012/064378 dated Sep. 26, 2013.

Unofficial English Translation of Japanese Office Action issued in connection with corresponding JP Application No. 2014547247 on Aug. 4, 2015.

* cited by examiner

CONTAINMENT CASE AND METHOD OF MANUFACTURE

BACKGROUND

The invention relates generally to containment cases and, more particularly, to containment cases with enhanced impact resistance.

Gas turbine engines are extensively used to propel an aircraft. A typical turbofan engine includes large, ducted fans placed at the front of the engine. The fans serve to produce greater thrust and reduce specific fuel consumption. During the operation of such engines, there is a remote possibility that a foreign body, such as a bird, could impact the fan(s) and cause severe fan damage. That damage could result in part or all of a fan blade becoming detached from the hub and impacting the fan case, or casing. Such a detached fan blade could cause considerable damage to the aircraft powered by the engine if it were not contained by the fan case. Similar damage could also result if the fan blade suffered failure through fatigue. In order to prevent such damage, various containment systems have been employed. Conventional containment cases, or casings, are typically formed of a solid metal having a thickness sufficient to withstand the impact of a fan blade within the plane of the fan. However, blade containment achieved by these methods generally incurs significant additional weight.

Composite materials are being evaluated for use in containment cases and would provide considerable weight benefits. However, composites can be subject to puncture at the interior surface of the containment case. In particular, composite blade containment cases are susceptible to damage due to sharp object impact. Accordingly, it would be advantageous to provide a blade containment case with improved impact resistance.

BRIEF DESCRIPTION

In accordance with one exemplary embodiment, a blade containment case is disclosed. The blade containment case comprising a composite core having an inner surface and an outer surface, at least one puncture resistant layer and at least one energy capture layer. The at least one puncture resistant layer is integrated with the composite core and includes a resin to bond the at least one puncture resistant layer to the inner surface of the composite core. The at least one energy capture layer is integrated with the composite core and includes a resin to bond the at least one energy capture layer to the outer surface of the composite core.

In accordance with another exemplary embodiment, a containment case is disclosed including a composite core with an inner surface and an outer surface, at least one puncture resistant layer disposed in a primary impact zone and integrated with the composite core and at least one energy capture layer disposed in a primary impact zone and integrated with the composite core. The at least one puncture resistant layer is configured coextensive with a length of the composite core and includes a resin to bond the at least one puncture resistant layer to the inner surface of the composite core. The at least one puncture resistant layer is characterized by a high through-thickness shear strength and a high interlaminar toughness at impact. The at least one energy capture layer is configured coextensive with a length of the composite core and includes a resin to bond the at least one energy capture layer to the outer surface of the composite core. The at least one energy capture layer is characterized by a high in-plane tensile strength and low resistance to delamination and fiber-matrix debonding at impact.

In accordance with another exemplary embodiment, a method of fabricating a containment case is disclosed. The method comprises the steps of disposing one or more layers of a puncture resistant material on a layup mandrel, disposing one more layers of a structural composite material on an exterior surface of the puncture resistant material, disposing one or more layers of an energy capture material on an exterior surface of the structural material and curing a resin in the composite core, the one or more layers of the puncture resistant material and the one or more layers of the energy capture material.

These and other advantages and features will be better understood from the following detailed description of preferred embodiments of the invention that is provided in connection with the accompanying drawings.

BRIEF DESCRIPTION OF DRAWINGS

These and other features, aspects, and advantages of the disclosed embodiments will become better understood when the following detailed description is read with reference to the accompanying drawings in which like characters represent like parts throughout the drawings, wherein.

DETAILED DESCRIPTION

In the following description, like reference characters designate like or corresponding parts throughout the several views shown in the figures. It is also understood that terms such as "top," "bottom," "outward," "inward," "first," "second," and the like are words of convenience and are not to be construed as limiting terms. Furthermore, whenever a particular aspect of the invention is said to comprise or consist of at least one of a number of elements of a group and combinations thereof, it is understood that the aspect may comprise or consist of any of the elements of the group, either individually or in combination with any of the other elements of that group.

Referring to the drawings in general, it will be understood that the illustrations are for the purpose of describing particular embodiments of the blade containment case, system and method disclosed herein and are not intended to be limiting.

Figure 1:
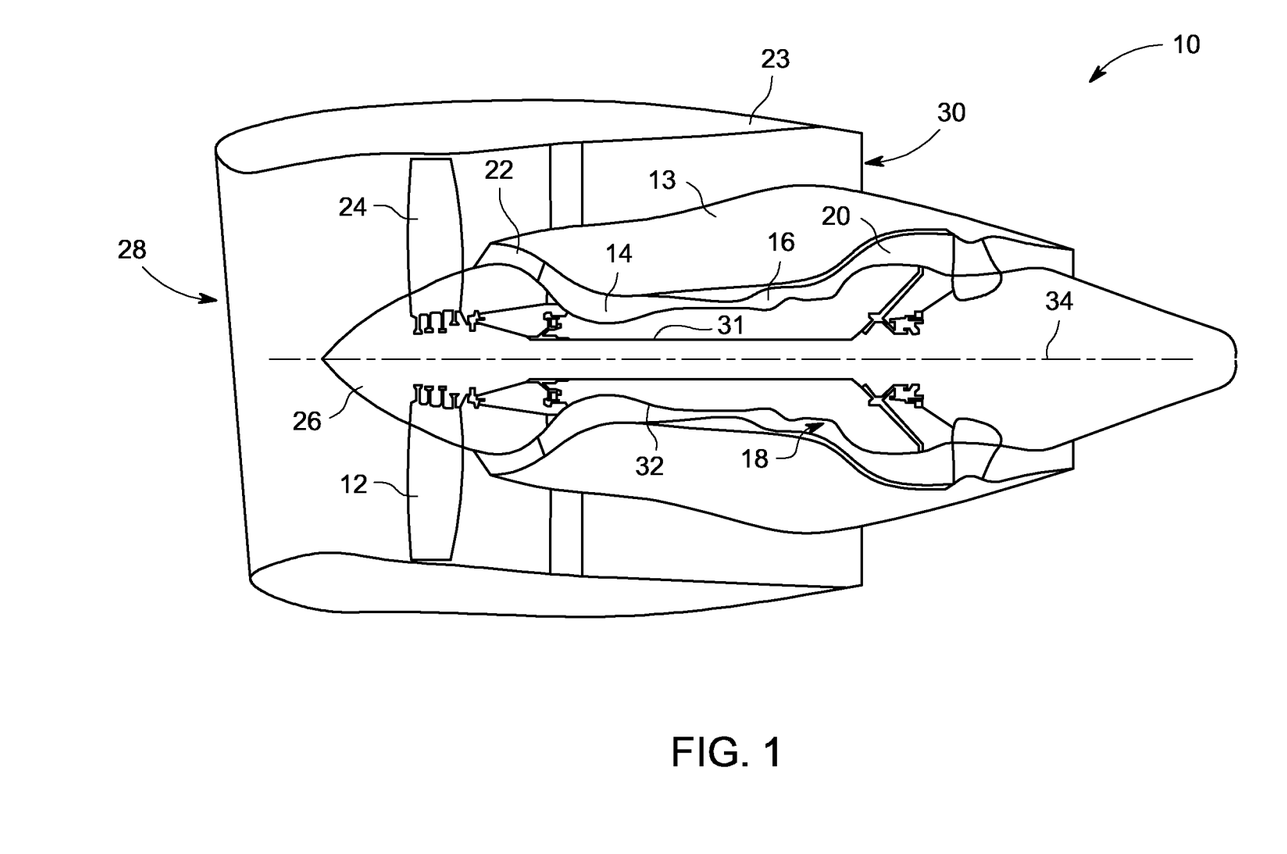
FIG. 1 is a longitudinal cross-sectional view illustrating an exemplary gas turbine engine incorporating a blade containment system in accordance with an embodiment.

A blade containment case for a gas turbine engine is described in detail below. FIG. 1 schematically illustrates a gas turbine engine 10. The disclosed embodiments are not limited to use in a specific gas turbine engine, and the engine shown in FIG. 1 is for illustrative purposes only. The gas turbine 10 includes a fan assembly 12 and a core engine 13 including a high-pressure compressor 14, a combustor 16, a high-pressure turbine 18, a low-pressure turbine 20, and a booster 22. The fan assembly 12 is surrounded by a blade containment case 23 and includes an array of fan blades 24 extending radially outward from a rotor disc 26. The engine 10 has an intake side 28 and an exhaust side 30. The fan assembly 12 and the low-pressure turbine 20 are coupled by a first rotor shaft 31, and the compressor 14 and the high-pressure turbine 18 are coupled by a second rotor shaft 32.

During operation, air flows through the fan assembly 12, along a central axis 34, and compressed air is supplied to the high-pressure compressor 14. The highly compressed air is delivered to the combustor 16. Airflow (not shown in FIG. 1) from the combustor 16 drives the fan assembly 12 by way of the first rotor shaft 31.

Figure 2:
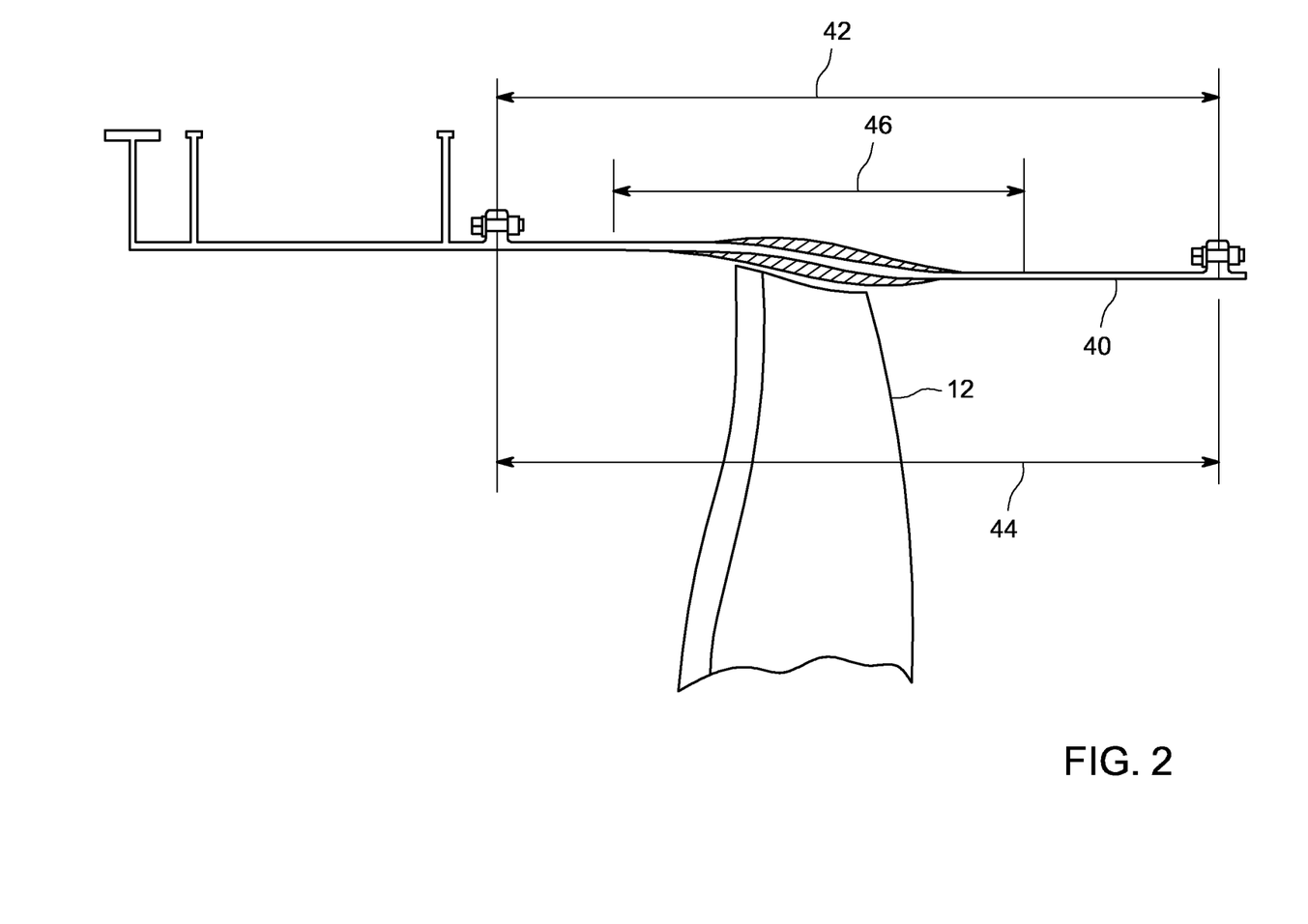
FIG. 2 is an enlarged fragmentary longitudinal schematic cross-sectional view illustrating the blade containment case shown in FIG. 1.
Figure 3:
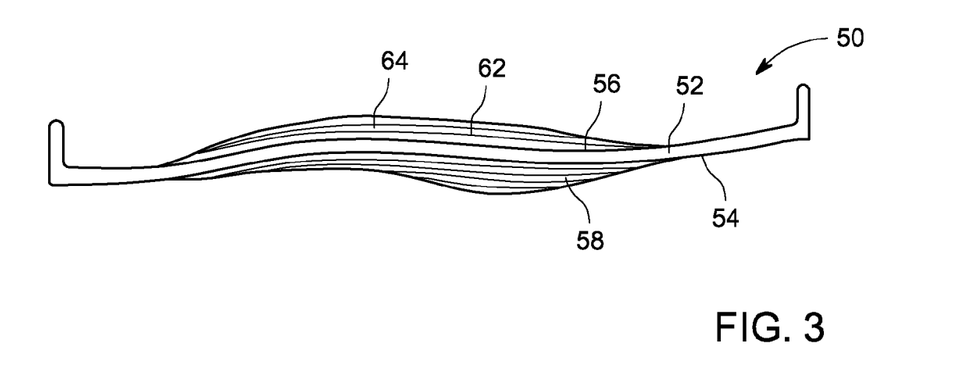
FIG. 3 is a further enlarged fragmentary longitudinal cross-sectional view illustrating a portion of the blade containment case shown in FIG. 2, in accordance with an embodiment.
Figure 4:
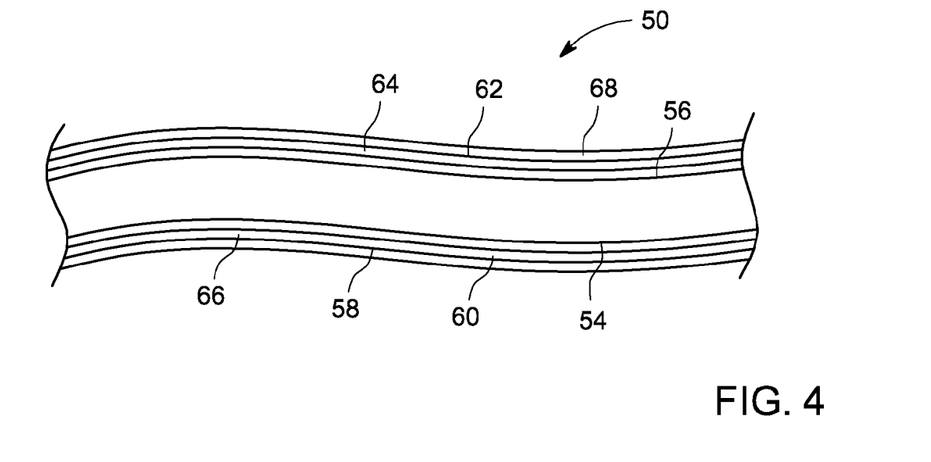
FIG. 4 is a further enlarged fragmentary longitudinal cross-sectional view illustrating a portion of the blade containment case shown in FIG. 3, in accordance with an embodiment.

FIG. 2 is an enlarged fragmentary longitudinal schematic cross-sectional view illustrating a blade containment case 40, generally similar to blade containment case 23 of FIG. 1. FIGS. 3 and 4 are further enlarged fragmentary longitudinal schematic cross-sectional views further illustrating a blade containment case 50, generally similar to blade containment case 23 of FIG. 1. Referring more specifically to FIG. 2, in an exemplary embodiment, the blade containment case 40 is a hardwall containment system that includes a length 42 that is approximately equal to a fan assembly length 44. More specifically, the length 42 circumscribes a primary impact region 46 of the fan assembly 12. "Primary impact region" as defined herein imply a region extending both axially and circumferentially around the inner surface of a composite core where a fan blade is most likely to be ejected from the fan assembly. The details of the blade containment case 40 will be described in detail below.

In an exemplary embodiment shown in FIGS. 3 and 4, the blade containment case 50 comprises a composite core 52 with an inner surface 54 and an outer surface 56. As indicated in FIGS. 3 and 4, at least one puncture resistant layer 58 is integrated with the composite core 52 on the inner surface 54 thereof. The at least one puncture resistant layer 58 is bonded to the inner surface 54 of the composite core 52 with a resin 60. Beneficially, the puncture resistant layer(s) 58 would reduce the instance where the blade containment case 50 is punctured during fan blade failure. In addition, at least one energy capture layer 62 is integrated with the composite core 52 on the outer surface 56 thereof. The at least one energy capture layer 62 is bonded to the outer surface 56 of the composite core 52 with a resin 64. Beneficially, the outer energy capture layer(s) 62 would provide deformation of the blade containment case 50 due to high tension resistance and delamination properties. For the illustrated embodiments, the puncture resistant layer(s) 58 and the energy capture layer(s) 62 are coextensive with a length of the composite core 52. However, in other embodiments, one or both of the layer(s) 58 and 62 may be locally disposed. For example, the puncture resistant layer(s) 58 may be configured proximate a leading edge of a fan blade(s) to provide local, enhanced impact resistance.

The utilization of multiple material layers or zones, and more particularly the utilization of the puncture resistant layer(s) 58 and the energy capture layer(s) 62 in combination with the composite core 52, for blade containment provide optimization of impact resistance based on different impact failure mechanisms of the differing material layers and the capabilities of the differing materials. At a sharp object impact region, such as primary impact region 46, the impacted inner layer of the blade containment case 50 is subjected to through-thickness shear dominant loading and the exterior layer is subjected to tension dominant loading. A material system with high resistance to both through-thickness shear and delamination at an interior surface of the blade containment case 50 and high resistance to tension and prone to delamination at an exterior surface of the blade containment case 50 would provide beneficial impact resistance qualities.

Accordingly, in a number of applications, the puncture resistant layer(s) 58 comprises a fiber/resin material with high through-thickness shear strength and high interlaminar toughness at impact. More specifically, in an embodiment the puncture resistant layer(s) 58 may comprise fibers comprised of S2 glass, E-glass, quartz, alumina, silica, boron oxide, or carbon fibers and a toughened resin, such as dicyclopentadiene (DCPD) or other resin with high fracture toughness (with or without nano particles and resin tougheners), a ceramic material, textile architecture, or other materials or architectures with high-through thickness shear capability.

The fibers 66 may comprise any of the various fiber architectures available. In the illustrated embodiment, the puncture resistant layer(s) 58 may comprise S2 glass fibers 66 that may include chopped fibers, continuous monofilament, a tow, a yarn, or roving consisting of a multitude of monofilaments, or continuous fiber tows or yarns that may be made from shorter fibers and woven or braided into a fabric. One skilled in the art would select a specific fiber architecture depending on the end use requirements. More specifically, the selection of the fiber architecture may depend on several factors. These factors include the directionality of the stress to which the fibers 66 will be subjected to and various other factors. The glass fibers 66 may form a woven fabric, non-woven, a wrap, a blanket, a winding, a knitted fabric, a carded non-woven fabric, or a braided fabric.

Any suitable reinforcing fabric such as a ceramic fabric or a non-ceramic fabric may be used in the composite core 52. Some examples of non-ceramic fabrics include, but are not limited to, carbon fiber, graphite fiber, polyimide fiber, or aromatic polyamide fiber, ultra-high molecular weight polyethylene, and combinations thereof. Ultra-high molecular weight polyethylene provides relatively high energy absorption and is sold, for example, under the tradenames Spectra® and Dyneema®. Spectra® fiber is sold by Honeywell Specialty Materials, Morris N.J. Dyneema® fiber is sold by Dutch State Mines (DSM), the Netherlands. In an exemplary embodiment, the non-ceramic fabric comprises carbon fiber, which provides high mechanical strength and stiffness.

In a number of applications, the energy capture layer(s) 62 may comprise a fiber/resin material with high in-plane tensile strength and low resistance to delamination and fiber-matrix debonding at impact. The fibers may comprise any of the various fiber architectures available. More specifically, in an embodiment the energy capture layer(s) 62 may comprise fibers comprised of graphite, carbon, polyimide, aromatic polyamide, or ultra-high molecular weight polyethylene, and a resin, such as dicyclopentadiene (DCPD), or other resin that does not bond well with the fibers to facilitate delamination, tape architecture or other materials or architectures with high in-plane tensile capability. In addition, in an embodiment, a fiber sizing and/or surface treatment may be used to keep the fibers from bonding with the resin. In the illustrated embodiment, the energy capture layer(s) 62 may comprise carbon fibers 68 that may include chopped fibers, continuous monofilament, a tow, a yarn, or roving consisting of a multitude of monofilaments, or continuous fiber tows or yarns may be made from shorter fibers and woven into a fabric. One skilled in the art would select a specific fiber architecture depending on the end use requirements. More specifically, the selection of the fiber architecture may depend on several factors. These factors include the directionality of the stress to which the fiber will be subjected to and various other factors. The carbon fibers may form a woven fabric, non-woven, a wrap, a blanket, a winding, a knitted fabric, a carded nonwoven fabric, or a braided fabric.

Any suitable resin may be used in bonding the puncture resistant layer(s) 58 with the composite core 52 and the energy capture layer(s) 62 with the composite core 52. Example resins used in conjunction with the puncture resistant layer(s) 58 includes dicyclopentadiene (DCPD) or other resin with high fracture toughness that is capable of good adhesion with the fibers utilized in the puncture resistant layer(s) 58, such as, but not limited to, epoxies, bismaleimides, and polyimides. In an alternative embodiment, the puncture resistant layer(s) 58 may include resin tougheners, such as disclosed in U.S. Pat. No. 8,017,188, assigned to the same assignee, and incorporated herein by this reference. Example resins used in conjunction with the energy capture layer(s) 62 includes dicyclopentadiene (DCPD), a brittle resin, or other resin that includes poor adhesion properties to the fibers utilized in the energy capture layer(s) 62, such as, but not limited to epoxies, bismaleimides, polyimides, polyesters, and vinylesters.

The thickness, composition, and position of the various layers of the blade containment case may be designed based on the required physical properties, and end use application. FIG. 4 schematically illustrates a cross-section of a portion of a blade containment case 50 shown in FIG. 3, in which at least one puncture resistant layer(s) 58 is disposed on the inner surface 54 of the composite core 52, as shown in FIG. 4 and at least one energy capture layer(s) 62 is disposed on the outer surface 56 of the composite core 52. In the above embodiments, the thicknesses of the various layers can be determined empirically, and vary widely depending on the materials used, and the design criteria. Typically, the puncture resistant layer(s) 58 extend over the primary impact region 46 (FIG. 2) of the inner surface 54 of the composite core 52 and extend along a length of the composite core 52. In addition, typically the energy capture layer(s) 62 extend over the primary impact region 46 (FIG. 2) of the outer surface 56 of the composite core 52 and extend along a length of the composite core 52. Beneficially, the use of the puncture resistant layer(s) 58, the composite core 52 and the energy capture layer(s) 62 could reduce weight and/or cost, while providing blade containment.

Beneficially, by integrating the puncture resistant layer(s) 58 and the energy capture layer(s) 62 with the composite core 52, the above noted problems associated with known containment case configurations are eliminated. In this manner, the containment case 50 receives the benefit of the shear strength and tensile strength of the puncture resistant layer(s) 58 and the energy capture layer(s) 62 at the impact zones, so that hard objects are deflected from the case at impact without puncturing the blade containment case. Because the puncture resistant layer(s) 58 are integrated with the composite core 52, they are not subject to fragmentation at impact.

Figure 5:
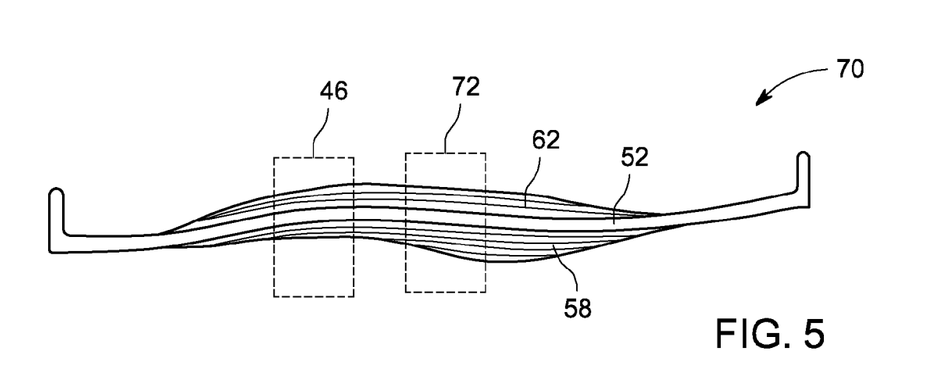
FIG. 5 is a further enlarged fragmentary longitudinal cross-sectional view illustrating a portion of a blade containment case in accordance with an embodiment.

In a preferred embodiment, the puncture resistant layer(s) 58 and the energy capture layer(s) 62 may facilitate the fabrication of a constant thickness composite core 52. FIG. 5 schematically illustrates an embodiment of a blade containment case 70, including a constant thickness composite core 52. In such embodiments, the composite core 52 is characterized by a substantially uniform thickness over an axial length of the composite core 52 including a primary impact region 46 and a root impact region 72. Similar to the previous embodiment, blade containment case 70 includes the benefit of the shear strength and tensile strength of the puncture resistant layer(s) 58 and the energy capture layer(s) 62.

Figure 6:
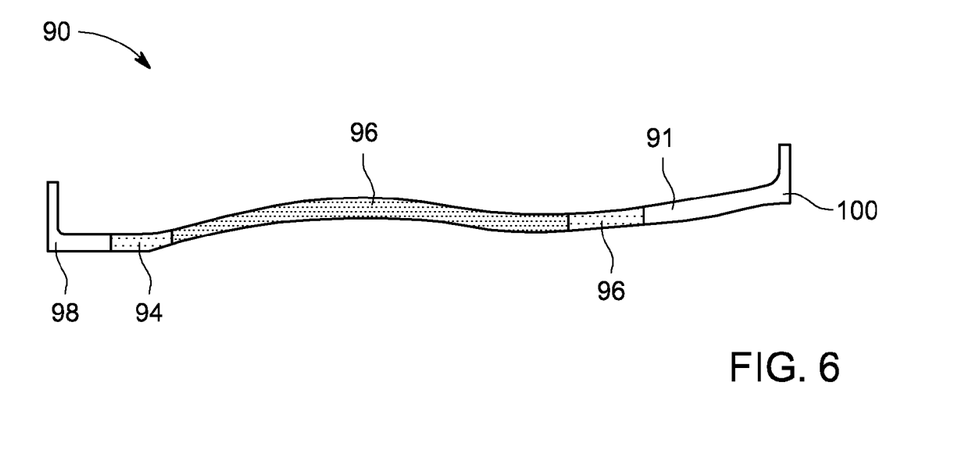
FIG. 6 is an enlarged fragmentary longitudinal cross-sectional view illustrating the blade containment case shown in FIG. 2, in accordance with an embodiment.
Figure 7:
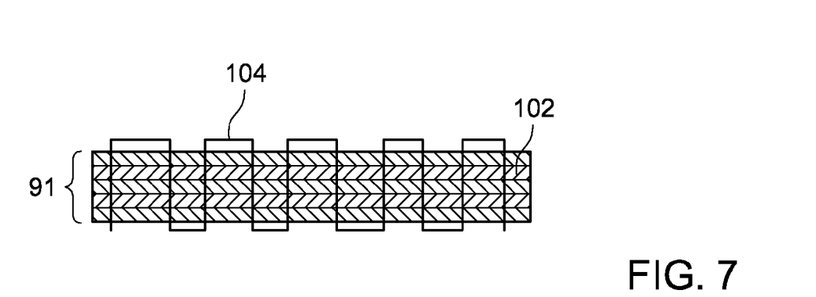
FIG. 7 is a schematic cross-sectional view illustrating a portion of the blade containment case shown in FIG. 7, in accordance with an embodiment.
Figure 8:
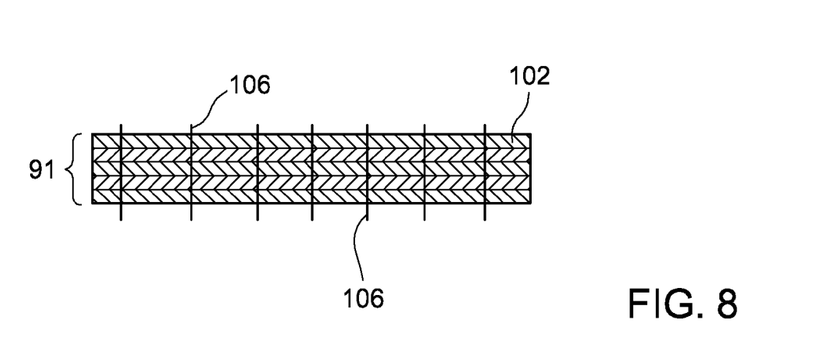
FIG. 8 is a schematic cross-sectional view illustrating a portion of the blade containment case shown in FIG. 7, in accordance with an embodiment.

Referring now to FIGS. 6-8, in an embodiment, a composite core 91, generally similar to the composite core 52 of FIGS. 3-5, may further include reinforcement stitching to control delamination upon impact by keeping any present delamination from spreading outside a primary impact region 92. Referring more specifically to FIG. 6, illustrated in schematic cross-sectional view is a portion of a blade containment case 90, and more particularly shown is the composite core 52, configured generally similar to blade containment case 50 of FIGS. 3 and 4, described herein. For clarity of illustration, it is noted that the puncture resistant layer(s) 58 and the energy capture layer(s) 62 are not shown in FIG. 6. The blade containment case 90 includes a primary impact region 92, a forward stitching zone 94 and an aft stitching zone 96. The incorporation of the forward stitching zone 94 and the aft stitching zone 96 prevents delaminations caused by an impact from spreading outside of the primary impact zone 92, and toward a forward end flange 98 and an aft end flange 100 which are the primary structural attachments. Referring to FIG. 7, illustrated is a portion of a composite core 91. The composite core 91 may be comprised of a plurality of composite material layers 102 and include through-thickness stitching 104. The through-thickness stitching 104 being located in the forward stitching zone 94 and/or the aft stitching zone 96. In an alternative embodiment, and as best illustrated in FIG. 8, through-thickness pinning 106 may be provided in the forward stitching zone 94 and/or the aft stitching zone 96, and/or combined with the through-thickness stitching 104 (of FIG. 7) in one of the forward stitching zone 96 and/or the aft stitching zone 98.

The above described blade containment cases have exceptional impact resistance and damage tolerance properties and provide significant weight savings compared to conventional metallic cases. The blade containment cases as disclosed facilitate containing a released blade or blade part within the containment case in the event a blade is released from the engine during operation, and effectively protect other parts of the engine.

Figure 9:
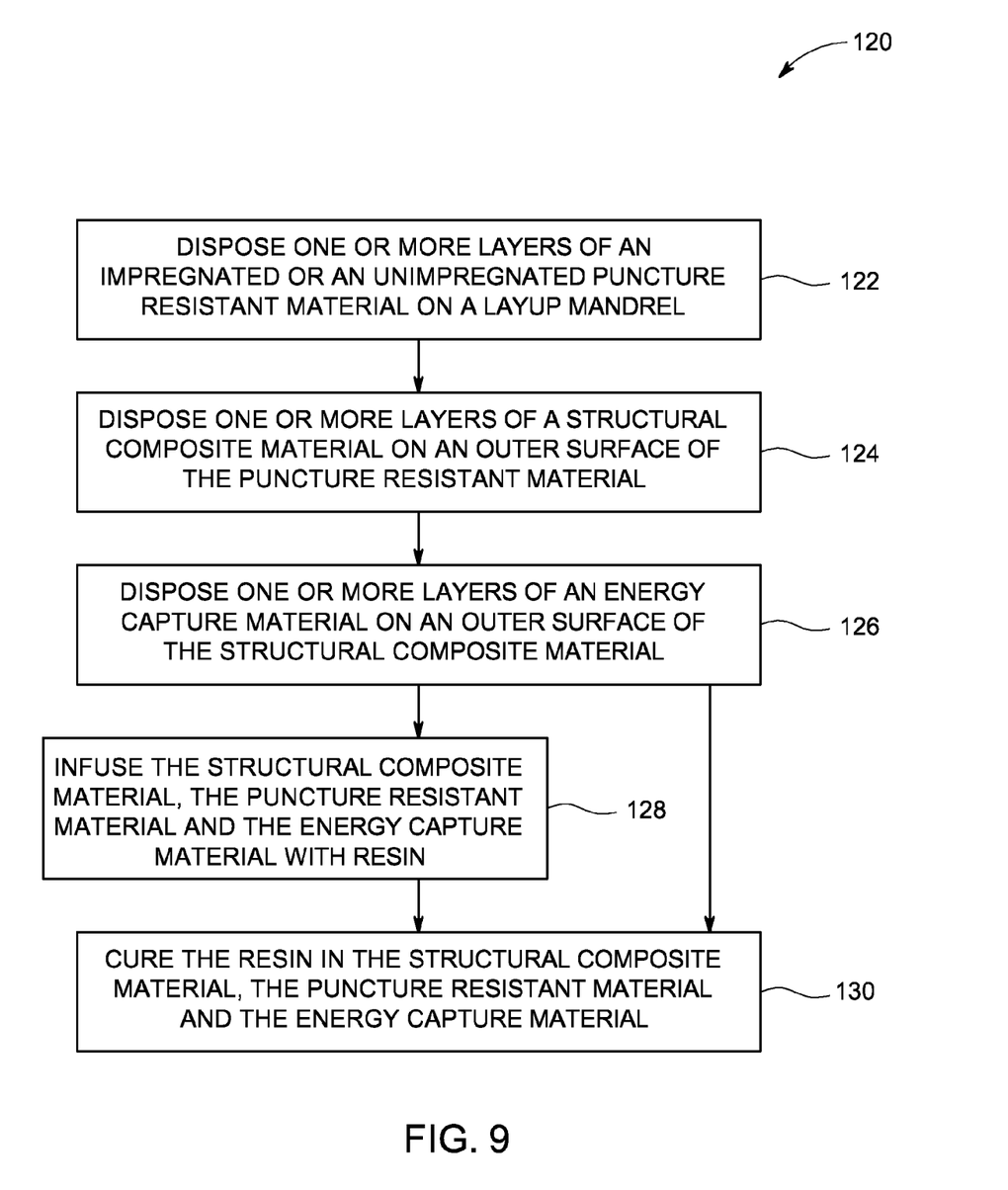
FIG. 9 is a flow chart of a method of fabricating a blade containment case, according to an embodiment.

A method for fabricating a blade containment case is described with reference to FIG. 9. Containment cases of any desired shape may be formed by any suitable forming technique, such as resin transfer molding (RTM), vacuum assisted resin transfer molding (VARTM), resin film infusion, thermoforming, as well as vacuum forming, such as vacuum infusion or pressure injection, and other techniques. As indicated for example in FIG. 9, a method 120 includes disposing one or more layers of a puncture resistant material on a layup mandrel using a winding or fiber placement process, in step 122. At step 124, disposing one more layers of a structural composite material on an exterior surface of the puncture resistant material using a winding or fiber placement process. At step 126, disposing one or more layers of an energy capture material on an exterior surface of the structural material using a winding or fiber placement process. At step 128, where unimpregnated material layers are utilized, the composite material, the puncture resistant material and the energy capture material are infused with resin. In an alternate method, pre-impregnated tapes, having resin applied to the fibers before the material is deposited, may be deposited in steps 122, 124, and 126, thereby eliminating the need for step 128. The resin is cured in step 130.

More specifically, alternate methods are disclosed for fabrication of a blade containment case disclosed herein. In a first method, preimpregnated tapes (resin applied to fibers before the material is deposited) are utilized as input material. Initially, one or more layers of the puncture resistant material are disposed on a layup mandrel using a winding or fiber placement process. These layers would only be located in the middle region of the blade containment case, and thus would not extend over the full extent of the tool. In order to achieve high puncture resistance, a special winding pattern may be utilized to provide a large number of fiber interlocks (additional information regarding the inclusion of such winding patterns may be provided by U.S. Pat. No. 7,713,021, assigned to the same assignee, and incorporated herein by this reference.) Next, one or more layers of a structural composite material are disposed on an upper surface of the puncture resistant material using a winding or fiber placement process. At least some of the structural composite material layers would extend to the forward and aft edges of the containment case. The structural composite material layers may utilize a conventional winding approach wherein no interlocking of the fibers is included, thus providing higher strength for operational and vibratory loads. Subsequent to the disposing of the structural composite material layers, one or more layers of an energy capture material are disposed on an upper surface of the composite structural material using a winding or fiber placement process. The energy capture material layer(s) would typically be located only in the middle region of the blade containment case. In an embodiment, the energy capture material layer(s) may not be aligned with the puncture resistant material layer(s). In an embodiment, the energy capture material layer(s) may be configured to include a highly interlocked arrangement such as described in U.S. Pat. No. 7,713,021, assigned to the same assignee and incorporated herein by this reference. A curing process, typically under heat and pressure, may be provided to cure the pre-impregnated material layers.

In another disclosed method, unimpregnated materials, and more particularly dry woven materials, braided materials, or individual fiber tows that have been tackified are utilized as input material. Initially, one or more layers of the puncture resistant material (e.g. braid or weave) are disposed on a layup mandrel using a wrapping, winding or fiber placement process. Similar to the previously disclosed method, these layers would only be located in the middle region of the blade containment case, and thus would not extend over the full extent of the tool. Similarly, to achieve high puncture resistance, a special winding pattern may be utilized to provide a large number of fiber interlocks. Next, one more layers of a structural composite material are disposed on an upper surface of the puncture resistant material using a wrapping, winding or fiber placement process. At least some of the structural composite material layers would extend to the forward and aft edges of the containment case. The structural composite material layers may include a weave pattern with very little fiber undulation or be disposed using a winding or fiber placement process to place dry fiber tows. In an embodiment, the fiber tows may have to be slightly tackified with resin to provide adequate adhesion, but would not be fully impregnated with a resin. Different types of tackifiers and methods of application are well known to those skilled in the art and are not repeated here. Subsequent to the disposing of the structural composite material layers, one or more layers of an energy capture material (e.g. braid or weave) are disposed on an upper surface of the composite structural material using a wrapping, winding or fiber placement process. The energy capture material layer(s) would typically be located only in the middle region of the blade containment case and may not be aligned with the puncture resistant material layer(s). Next, the structure composite material layers(s), the puncture resistant material layer(s) and the energy capture material layer(s) are infused with resin (e.g. epoxy, DCPD). A curing process, typically under heat and pressure, may subsequently be provided to cure the now impregnated material layers.

Regarding steps 122, 124 and 126, the number and position of the various material layers depend on the desired configuration of the composite case. In an alternate embodiment, these material layers may be provided in a mold. The shape, size and configuration of the mold may depend, in part, on the shape and size of the composite case to be manufactured. Molds and associated parts are known in the art and are not described in detail herein.

Regarding step 128, the infusion of the resin may be controlled by a pressure gradient, for a resin transfer process. The number and position of the sources of pressure gradient and resin injection partly depends on the specific system design and the resin article configuration. Each resin and vacuum source may be controlled individually using a valve or other means of stopping the flow of material. The flow of resin may be stopped when sufficient resin has entered the layers. The flow may be controlled by properly adjusting the resin gel time and/or measuring the amount of resin that has entered the layers and stopping the flow of resin when a pre-metered amount of resin has infused the layers, or using a sensor to control the flow of resin. One skilled in the art would be able to control infusion of resins based on the specific requirements.

Regarding step 130, the resins may be catalyzed for high temperature cure or room temperature cure and for various cures times as is compatible with the needs of the process. The resins may be properly catalyzed and degassed prior to injection into the fiber preform. The wide variety of useful resins and the methods of preparing the resins are all widely known in the art. One skilled in the art would know how to choose a suitable resin and process it depending on the end use application.

In yet another alternate method, the resin in the energy-capture material layer(s) may be formed having an unusually high level of porosity in order to facilitate debonding between the fiber and the resin that comprise the material layer(s) and promote delamination between the material layer(s). In typical structural composites, efforts are made to keep the porosity level below about 2% of the total composite volume. In an embodiment where the resin in the energy-capture layer(s) is formed having an unusually high level of porosity, the porosity level may be greater than 5% and in an exemplary embodiment, more than 20%.

Figure 10:
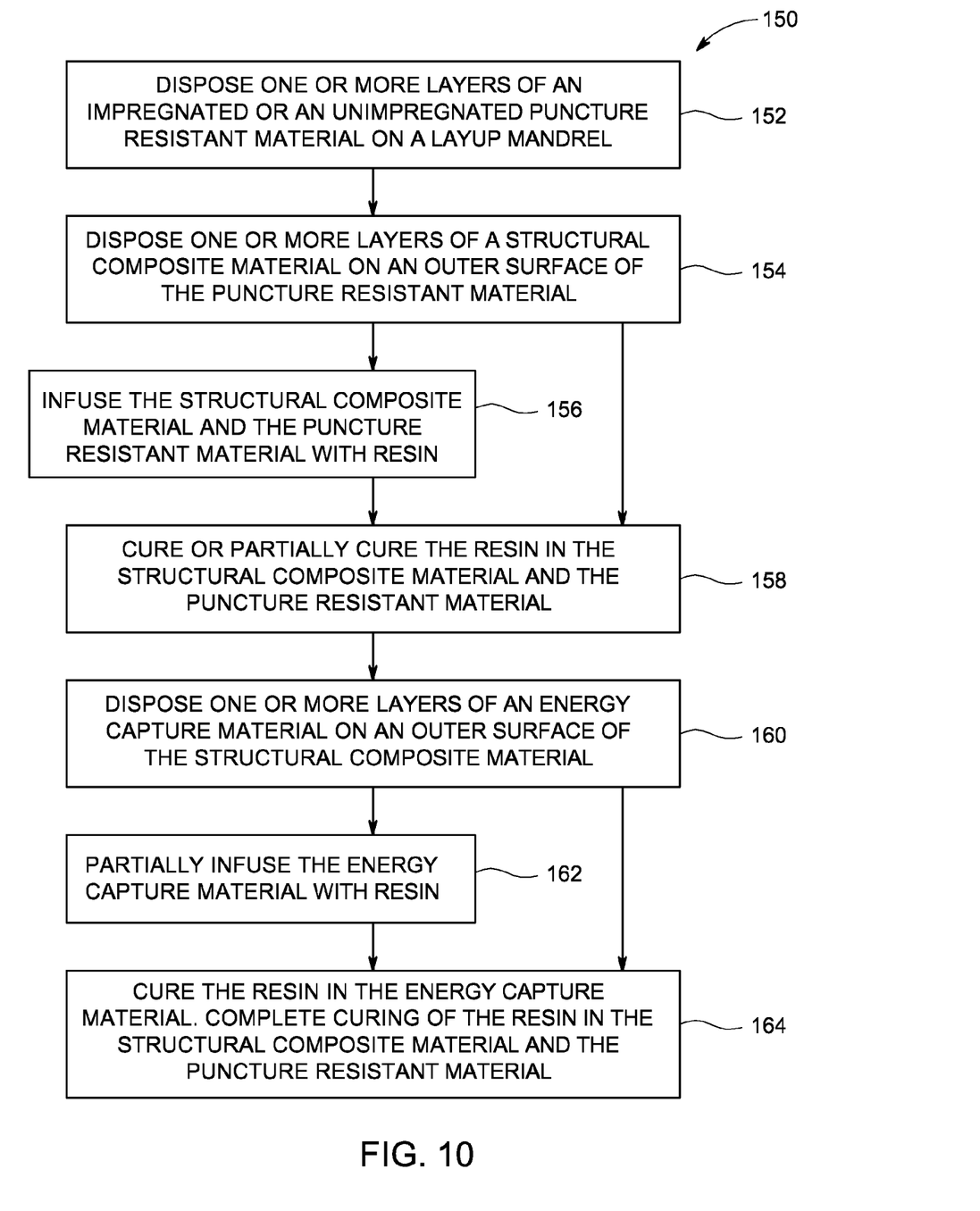
FIG. 10 is a flow chart of a method of fabricating a blade containment case, according to an embodiment.

Accordingly a method for fabricating a blade containment case wherein a resin in the energy-capture layer(s) may be formed having an unusually high level of porosity is described with reference to FIG. 10. Similar to the previously defined method(s), the containment cases may be of any desired shape and formed by any suitable forming technique, such as resin transfer molding (RTM), vacuum assisted resin transfer molding (VARTM), resin film infusion, thermoforming, as well as vacuum forming, such as vacuum infusion or pressure injection, and other techniques. As indicated for example in FIG. 10, the method 150 includes disposing one or more layers of a puncture resistant material on a layup mandrel using a winding or fiber placement process, in step 152. At step 154, disposing one more layers of a structural composite material on an exterior surface of the puncture resistant material using a winding or fiber placement process. At step 156, and in contrast to the previously described method(s), where unimpregnated material layers are utilized, the composite material and the puncture resistant material are infused with resin, prior to the deposition of the energy capture material. In an alternate method, pre-impregnated tapes, having resin applied to the fibers before the material is deposited, may be deposited in steps 152 and 154, thereby eliminating the need for step 156. Next at step 158, the composite material and the puncture resistant material are cured, either partially or fully. The full or partial curing of the resin in the composite material and puncture resistant material will increase the viscosity of the resin and inhibit flow of resin into the energy capture layer under subsequent processing.

Step 160 includes disposing one or more layers of an energy capture material on an exterior surface of the structural material using a winding or fiber placement process. Either preimpregnated or "dry" materials can be used as noted previously. If "dry" materials are used, the fibers can be tackified with a small amount of resin to allow them to adhere to the composite material. If a high level of porosity in the energy capture material layer(s) is desired, no further resin infusion may be necessary. If additional resin is desired, it can be added to the energy capture material in a separate infusion step using processing conditions that will promote high porosity such as low infusion pressure. More specifically, at step 162, where unimpregnated material layers are utilized, the energy capture material layer(s) may be infused with resin. Finally, the full assembly is subjected to a cure cycle at step 164 to cure the resin in the energy capture material layer(s) and, if necessary, finish curing the resin in the composite core material layer(s) and puncture resistant material layer(s). Low cure pressures may be desired in this cycle to facilitate high porosity in the energy capture layer.

For the illustrated method(s), the puncture resistant layer(s) and the energy capture layer(s) may comprise any suitable material including the materials and fabrics listed above with reference to the composite case embodiments.

Although only certain features of the invention have been illustrated and described herein, many modifications and changes will occur to those skilled in the art. It is, therefore, to be understood that the appended claims are intended to cover all such modifications and changes as fall within the true spirit of the invention. It should be understood that though the above embodiments are discussed with respect to a containment case for a turbo machinery, the embodiments of the invention may be utilized in other applications where similar protection is required.

The invention claimed is:

1. A blade containment case in a gas turbine engine of an aircraft housing therein a fan assembly, including a fan blade, the blade containment case comprising:
   a primary impact region;
   a composite core having an inner surface and an outer surface, wherein the composite core extends over the primary impact region;
   at least one puncture resistant layer integrated with the composite core at least in the primary impact region, wherein the at least one puncture resistant layer includes a resin to bond the at least one puncture resistant layer to the inner surface of the composite core, the at least one puncture resistant layer comprising a fiber and resin material having a through-thickness shear strength and an interlaminar toughness configured to provide resistance to through-thickness shear and resistance to delamination at an interior surface of the blade containment case upon an impact with at least one of a released fan blade or a released fan blade part of the fan assembly and wherein the puncture resistant layer is configured to contain the released fan blade or the released fan blade part of the fan assembly within the blade containment case; and
   at least one energy capture layer integrated with the composite core at least in the primary impact region, the at least one energy capture layer comprising a fiber and resin material having an in-plane tensile strength and an interlaminar toughness less than the interlaminar toughness of the at least one puncture resistant layer and wherein the resin has a porosity level of greater than 5% of the total composite volume, thus configured to resist tension while providing delamination and debonding between the fiber and the resin at an exterior surface of the blade containment case upon said impact of the at least one puncture resistant layer with at least one of the released fan blade or the released fan blade part of the fan assembly.

2. The containment case of claim 1, wherein the at least one puncture resistant layer comprises at least one of a nonwoven fabric, a wrap, a blanket, a winding, a woven fabric, a knitted fabric, a carded non-woven fabric, or a braided fabric.

3. The containment case of claim 2, wherein the at least one puncture resistant layer comprises fibers comprised of at least one of S2 glass, E-glass, quartz, alumina, silica, boron oxide, or carbon and a dicyclopentadiene (DCPD) resin.

4. The containment case of claim 3, wherein the at least one puncture resistant layer comprises S2 glass fibers and a dicyclopentadiene (DCPD) resin.

5. The containment case of claim 1, wherein the at least one energy capture layer comprises at least one of a nonwoven fabric, a wrap, a blanket, a winding, a woven fabric, a knitted fabric, a carded non-woven fabric, or a braided fabric.

6. The containment case of claim 5, wherein the at least one energy capture layer comprises fibers comprised of at least one of graphite, carbon, polyimide, aromatic polyamide, or ultra-high molecular weight polyethylene and a dicyclopentadiene (DCPD) resin.

7. The containment case of claim 6, wherein the at least one energy capture layer further comprises at least one of a fiber sizing or surface treatment for minimizing fiber-to-resin adhesion.

8. The containment case of claim 6, wherein the at least one energy capture layer comprises carbon fibers and a dicyclopentadiene (DCPD) resin.

9. The containment case of claim 1, wherein the at least one puncture resistant layer comprises S2 glass fibers and a dicyclopentadiene (DCPD) resin and the at least one energy capture layer comprises carbon fibers and a dicyclopentadiene (DCPD) resin.

10. The containment case of claim 1, wherein the composite core comprises a reinforcing fabric.

11. The containment case of claim 10, wherein the composite core further includes reinforcement stitching to control delamination upon impact.

12. A blade containment case in a gas turbine engine of an aircraft housing therein a fan assembly, including a fan blade, the blade containment case comprising:

a primary impact region;

a composite core with an inner surface and an outer surface, wherein the composite core extends over the primary impact region;

at least one puncture resistant layer disposed in the primary impact region and integrated with the composite core, wherein the at least one puncture resistant layer is configured coextensive with a length of the composite core and includes a dicyclopentadiene (DCPD) resin to bond the at least one puncture resistant layer to the inner surface of the composite core, the at least one puncture resistant layer comprising a fiber and resin material having a through-thickness shear strength and an interlaminar toughness configured to provide resistance to through-thickness shear and resistance to delamination at an interior surface of the blade containment case upon an impact with at least one of a released fan blade or a released fan blade part of the fan assembly and wherein the puncture resistant layer is configured to contain the released fan blade or the released fan blade part of the fan assembly within the blade containment case; and at least one energy capture layer disposed in the primary impact region and integrated with the composite core, wherein the at least one energy capture layer comprises a fiber and resin material configured coextensive with a length of the composite core, wherein the resin includes a dicyclopentadiene (DCPD) resin to bond the at least one energy capture layer to the outer surface of the composite core, the at least one energy capture layer having an in-plane tensile strength and an interlaminar toughness less than the interlaminar toughness of the at least one puncture resistant layer and wherein the resin has a porosity level of greater than 5% of the total composite volume, thus configured to resist tension while providing delamination and debonding between the fiber and the resin at an exterior surface of the blade containment case upon said impact of the at least one puncture resistant layer with at least one of the released fan blade or the released fan blade part of the fan assembly.

13. The containment case of claim 12, wherein the at least one puncture resistant layer comprises fibers comprised of S2 glass, E-glass, quartz, alumina, silica, boron oxide, or carbon fibers and the dicyclopentadiene (DCPD) resin.

14. The containment case of claim 13, wherein the at least one puncture resistant layer comprises S2 glass fibers and a dicyclopentadiene (DCPD) resin.

15. The containment case of claim 12, wherein the at least one energy capture layer comprises fibers comprised of at least one of graphite, carbon, polyimide, aromatic polyamide, or ultra-high molecular weight polyethylene and a resin that does not bond well with the fibers to facilitate delamination and fiber-matrix debonding.

16. The containment case of claim 15, wherein the at least one energy capture layer comprises carbon fibers and a dicyclopentadiene (DCPD) resin.

17. The containment case of claim 12, wherein the at least one puncture resistant layer comprises S2 glass fibers and a dicyclopentadiene (DCPD) resin and the at least one energy capture layer comprises carbon fibers and a dicyclopentadiene (DCPD) resin.

* * * * *